(12) United States Patent
Takani et al.

(10) Patent No.: US 11,261,306 B2
(45) Date of Patent: Mar. 1, 2022

(54) RESIN MATERIAL STRUCTURE OF SLIDE FASTENER ELEMENT HAVING RUBBER LAYER

(71) Applicant: YKK CORPORATION, Tokyo (JP)

(72) Inventors: Go Takani, Guangdong (CN); Yusuke Ito, Guangdong (CN); Fulin Miao, Guangdong (CN); Ye Yuan, Guangdong (CN)

(73) Assignee: YKK CORPORATION, Tokyo (JP)

( * ) Notice: Subject to any disclaimer, the term of this patent is extended or adjusted under 35 U.S.C. 154(b) by 0 days.

(21) Appl. No.: 16/033,230

(22) Filed: Jul. 12, 2018

(65) Prior Publication Data
US 2019/0021454 A1  Jan. 24, 2019

(30) Foreign Application Priority Data
Jul. 19, 2017 (CN) .......................... 201710590408.2

(51) Int. Cl.
*C08J 7/043* (2020.01)
*B05D 7/02* (2006.01)
(Continued)

(52) U.S. Cl.
CPC .............. *C08J 7/043* (2020.01); *A44B 11/00* (2013.01); *A44B 17/0029* (2013.01);
(Continued)

(58) Field of Classification Search
CPC ....... Y10T 24/25; C08J 7/042; C08J 2421/00; C08J 2400/24; C08J 2367/02;
(Continued)

(56) References Cited

U.S. PATENT DOCUMENTS 4,251,582 A * 2/1981 Bernier .................. A44B 19/26
148/251
6,353,983 B1 * 3/2002 Oda ....................... A44B 19/26
24/429
(Continued)

FOREIGN PATENT DOCUMENTS

CN    202145716         2/2012
CN    102382556 A  *   3/2012
(Continued)

OTHER PUBLICATIONS

Espacenet Translation of CN-102382556-A (Year: 2020).*
(Continued)

*Primary Examiner* — Michael Zhang
(74) *Attorney, Agent, or Firm* — JCIPRNET (57) ABSTRACT

The disclosure discloses a method for forming a rubber layer on a surface of a resin material. In the method, painting is first performed on the surface of the resin material to form a painting layer, using a paint to which a pigment has been added; then, rubber coating is performed to form a rubber layer on the painting layer. The method of the disclosure may be used in surface treatment of a fastener product. The disclosure further discloses a slide fastener, a buckle and a snap button using the method of the disclosure. The method of the disclosure may solve a conventional problem that a rubber coating is likely to fall off a resin surface, and the rubber on the surface of the resultant fastener product is less likely to fall off.

10 Claims, 9 Drawing Sheets

(51) Int. Cl.
| | |
|---|---|
| *B05D 7/00* | (2006.01) |
| *C08J 7/04* | (2020.01) |
| *A44B 11/00* | (2006.01) |
| *A44B 17/00* | (2006.01) |
| *A44B 19/42* | (2006.01) |
| *A44B 1/14* | (2006.01) |
| *A44B 19/24* | (2006.01) |

(52) U.S. Cl.
CPC .............. *A44B 19/42* (2013.01); *B05D 7/02* (2013.01); *B05D 7/54* (2013.01); *C08J 7/042* (2013.01); *A44B 1/14* (2013.01); *A44B 11/003* (2013.01); *A44B 17/0082* (2013.01); *A44B 19/24* (2013.01); *C08J 2367/02* (2013.01); *C08J 2400/24* (2013.01); *C08J 2421/00* (2013.01)

(58) Field of Classification Search
CPC .......... C08J 2400/00; B05D 7/54; B05D 7/02; A44B 17/0029; A44B 17/0082; A44B 11/00; A44B 11/003; A44B 11/25; A44B 1/14; A44B 1/34
See application file for complete search history.

(56) References Cited

U.S. PATENT DOCUMENTS

| | | | | |
|---|---|---|---|---|
| 2004/0111842 | A1* | 6/2004 | Imai | A44B 19/34 24/381 |
| 2004/0117954 | A1* | 6/2004 | Lin | A44B 19/262 24/429 |
| 2008/0164635 | A1* | 7/2008 | Werner | B29C 45/1671 264/255 |
| 2009/0288276 | A1* | 11/2009 | Dhanapal | A44B 19/306 24/421 |
| 2013/0019442 | A1* | 1/2013 | Yamakita | A44B 19/06 24/431 |

FOREIGN PATENT DOCUMENTS

| | | | | |
|---|---|---|---|---|
| CN | 203633609 | | 6/2014 | |
| CN | 104139574 | | 11/2014 | |
| DE | 19643861 | | 5/1998 | |
| EP | 1279460 | A1 * | 1/2003 | ........... A44B 19/262 |
| EP | 1676495 | A1 * | 7/2006 | ............. A44B 19/00 |
| JP | H04368886 | | 12/1992 | |
| JP | 3428908 | | 7/2003 | |
| TW | 201228608 | | 7/2012 | |
| TW | 201406318 | | 2/2014 | |
| TW | 201712102 | | 4/2017 | |
| WO | WO-0106886 | A1 * | 2/2001 | ............. A44B 19/42 |
| WO | 2012129382 | | 9/2012 | |

OTHER PUBLICATIONS

Espacenet Translation of CN 202145716 (Year: 2021).*
Office Action of Taiwan Counterpart Application, with English translation thereof, dated Jan. 21, 2020, pp. 1-18.
"Office Action of Taiwan Counterpart Application", dated May 19, 2020, with English translation thereof, p. 1-p. 16.
"Office Action of German Counterpart Application", dated Aug. 11, 2020, with English translation thereof, pp. 1-13.
Office Action of China Counterpart Application, with English translation thereof, dated Jan. 22, 2021, pp. 1-16.
Office Action of Taiwan Counterpart Application, with English translation thereof, dated Jun. 15, 2021, pp. 1-11.

* cited by examiner

RESIN MATERIAL STRUCTURE OF SLIDE FASTENER ELEMENT HAVING RUBBER LAYER

CROSS-REFERENCE TO RELATED APPLICATION

This application claims the priority benefit of China Application No. 201710590408.2, filed on Jul. 19, 2017. The entirety of the above-mentioned patent application is hereby incorporated by reference herein and made a part of this specification.

BACKGROUND

Technical Field

The disclosure relates to a surface treatment technique for a resin material, particularly to a method for forming a rubber layer on a surface of a resin material, as well as a slide fastener, a buckle and a snap button using the method.

Related Art

Fastener products (for example, slide fasteners, buckles and snap buttons) used in daily life are mainly made of resin materials. To maintain use intensity, hard plastic is generally used. As a result, the fastener products have harder surfaces which adversely affect hand feeling. When some of these harder surfaces directly contact human skin, they may cause pain to the skin.

A general solution is to apply a rubber coating on the surface of the resin material, such that the resultant additional rubber layer can create soft hand feeling and will not cause any pain to the human skin even in direct contact therewith. However, it is difficult to attach a rubber coating to a resin surface, and resin materials typically have relatively smooth surfaces. Thus, it is common to perform undercoating on the resin surface before applying the rubber coating thereto. Nonetheless, with respect to the products such as slide fasteners, buckles and snap buttons, it is found by comparison that the rubber coating in the above-mentioned method is still likely to fall off.

SUMMARY

The disclosure provides a method for forming a rubber layer on a surface of a resin material, as well as a slide fastener, a buckle and a snap button fabricated using the method, for solving the conventional problem that the rubber coating on the resin surface is likely to fall off.

The disclosure provides a method for forming a rubber layer on a surface of a resin material. In the method, painting is first performed on the surface of the resin material to form a painting layer, using a paint to which a pigment has been added; then, rubber coating is performed to form a rubber layer on the painting layer.

The disclosure further provides a resin material structure including a resin material body. A painting layer and a rubber layer are sequentially formed from inside to outside on a surface of the resin material body, and a paint for forming the painting layer contains a pigment.

The disclosure further provides a resin slide fastener including a slide fastener tape, a slide fastener element, and a slide fastener slider. A painting layer and a rubber layer are sequentially formed from inside to outside on an outer surface of the slide fastener element and/or the slide fastener slider, and a paint for forming the painting layer contains a pigment.

The disclosure further provides a resin snap button. A painting layer and a rubber layer are sequentially formed from inside to outside on an outer surface of the resin snap button, and a paint for forming the painting layer contains a pigment.

The disclosure further provides a resin buckle. A painting layer and a rubber layer are sequentially formed from inside to outside on an outer surface of the resin buckle, and a paint for forming the painting layer contains a pigment.

DESCRIPTION OF THE EMBODIMENTS

The embodiments of the disclosure are described below by way of specific examples. Those skilled in the art shall easily understand other advantages and effects of the disclosure according to the content disclosed in this specification. The disclosure may further be implemented or applied through other different embodiments. The details in this specification may also be modified or changed in various ways without departing from the spirit of the disclosure based on different viewpoints and applications.

It should be noted that the structures, scales and sizes as illustrated in the accompanying drawings are only used to illustrate the content disclosed in the specification, for being understood and read by those skilled in the art, and are not intended to limit implementation conditions of the disclosure. Therefore, they have no substantial technical meaning. Any modification in structure, change in scale, or adjustment in size should fall within the scope of the technical content disclosed in the disclosure without affecting the effects produced and objectives achieved by the disclosure. Meanwhile, terms such as "upper," "lower," "left," "right," "middle," "one" and the like as quoted in this specification are also only for clarity of the description instead of limiting the implementation scope of the disclosure, and any change or adjustment of their relative relationships should also be considered as falling within the scope of implementation of the disclosure without essentially changing the technical content.

Example 1

A rubber layer was formed on a surface of a resin material by using the following steps:

1) Configuration of an undercoat paint: A pigment was added to a common undercoat paint and then mixed uniformly, so that the weight percentage of the pigment in the paint was 10% to 30%.

It is known by tests that the proportion of the pigment should be at least 10% in order to more firmly fix the rubber layer. However, if the proportion of the pigment exceeds 30%, workability is reduced since it is difficult to uniformly mix the pigment with the paint. The undercoat paint may be an oil-based paint or a water-based paint. Examples thereof include an epoxy resin paint, an acrylic urethane paint, an acrylic melamine resin paint, a polyurethane paint, an alkyd resin paint, an acrylic paint, a chlorinated olefin paint, a polyurea elastomer, a silicone resin paint, a polysiloxane paint, a fluorine-containing polymer paint, an unsaturated polyester paint, a vinylester paint, a polyaniline paint and so on. The pigment may be various existing color pigments. Examples thereof include chrome yellow, antimony yellow, iron oxide yellow, cadmium yellow (CdS), hansa yellow, benzidine yellow, chromium oxide green, chrome green, iron blue, ultramarine blue, iron red (iron oxide red), cadmium red, molybdate red, iron black, aluminum powder (commonly known as silver powder), copper powder (commonly known as gold powder), zinc oxide, lithopone, titanium white, antimony white, white lead, carbon black, graphite, aniline black and so on. A rubber layer fastness test was carried out using carbon black as the pigment and an epoxy resin paint as the undercoat paint.

2) The undercoat paint was painted on the surface of the resin material and then dried for about 6 minutes to form a painting layer. The painting layer after drying had a thickness of about 30 μm to 50 μm. The resin material may be various hard plastics, and a polybutylene terephthalate (PBT) material was used in the rubber layer fastness test.

3) Rubber was coated on a surface of the painting layer by a common method, and then dried for about 6 minutes to form a rubber layer. A material of the rubber layer may be selected from various common rubbers such as chlorosulfonated polyethylene (CSM) rubber, nitrile butadiene rubber (NBR), chloroprene rubber (CR), styrene-butadiene rubber (SBR), natural rubber (NR) and so on. The rubber layer after drying had a thickness of about 5 μm to 20 μm.

Figure 1:
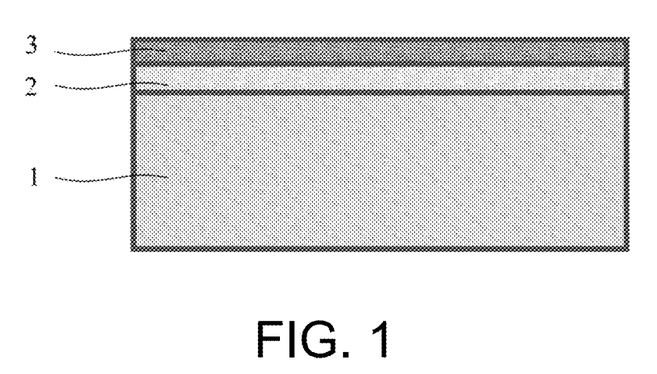
FIG. 1 is a schematic view of a structure of the disclosure, in which a rubber layer is formed on a surface of a resin material.

After the rubber layer was formed, as shown in FIG. 1, a painting layer 2 and a rubber layer 3 are sequentially provided on a resin material 1.

Painting Layer Roughness Detection Method:

The paint was painted on a flat plate. Then, the painting layer was measured using a micrometer having a feeler pin with an end radius of 10 μm or less, wherein ten points were randomly selected for detection (in order to prevent the painting layer from falling off due to movement of the feeler pin, and to be distinguishable from a conventional method in which a detector moves in a set direction), and the maximum values and the minimum values (unit: μm) were obtained. The above method was performed five times and a mean value was obtained.

Rubber Layer Fall-Off Resistance Experiment Method:

The painting layer and the rubber layer were coated on an upper surface of a slide fastener element of a slide fastener by using the aforesaid method. The slide fastener was sewn on a cloth, followed by water washing five times by a washing machine.

Comparative Example

The same steps as above were performed except that no pigment was added to the paint.

Experiment Result:

| Experiment Example | Proportion of Pigment | Roughness | Result of Water Washing |
| --- | --- | --- | --- |
| 1 | 10% | 2 μm | No fall-off |
| 2 | 20% | 2.2 μm | No fall-off |
| 3 | 30% | 7 μm | No fall-off |
| Comparative Example | 0 | 1 μm or less | Partial fall-off |

FIG. 2 to FIG. 17 respectively illustrate the embodiments of a slide fastener, a snap button and a buckle in which the rubber layer is formed on the surface of the resin material by using the method of the disclosure. In the slide fastener, the snap button and the buckle of these embodiments, the painting layer contains the pigment.

Figure 2:
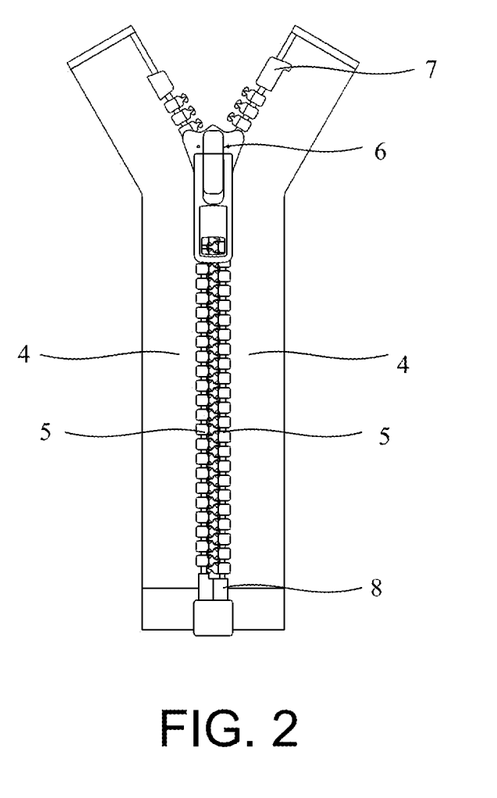
FIG. 2 is a top view of a first type and a second type of slide fastener according to an embodiment of the disclosure.

FIG. 2 illustrates an embodiment of the resin slide fastener of the disclosure. The resin slide fastener has a pair of slide fastener tapes 4, a slide fastener element row 5 and a slide fastener slider 6. The slide fastener element row 5 is disposed on an opposing edge of each of the slide fastener tapes 4, and includes a plurality of continuously arranged slide fastener elements. The slide fastener slider 6 for engaging or disengaging the slide fastener elements is disposed on the slide fastener element row 5. As the slide fastener slider 6 moves longitudinally along the slide fastener element row 5, the slide fastener elements on one of the slide fastener tapes 4 are engaged with or disengaged from the slide fastener elements on the other of the slide fastener tapes 4.

To improve hand feeling and touch feeling, a painting layer and a rubber layer are sequentially formed on a surface of the slide fastener element or the slide fastener slider 6 by using the method of the disclosure. The painting layer and the rubber layer may be formed on all or part of an exposed surface of the slide fastener element or the slide fastener slider 6. According to some embodiments, the painting layer and the rubber layer are formed at least on a surface of a portion of the slide fastener element or the slide fastener slider 6 that may contact a body or limb.

Figure 3:
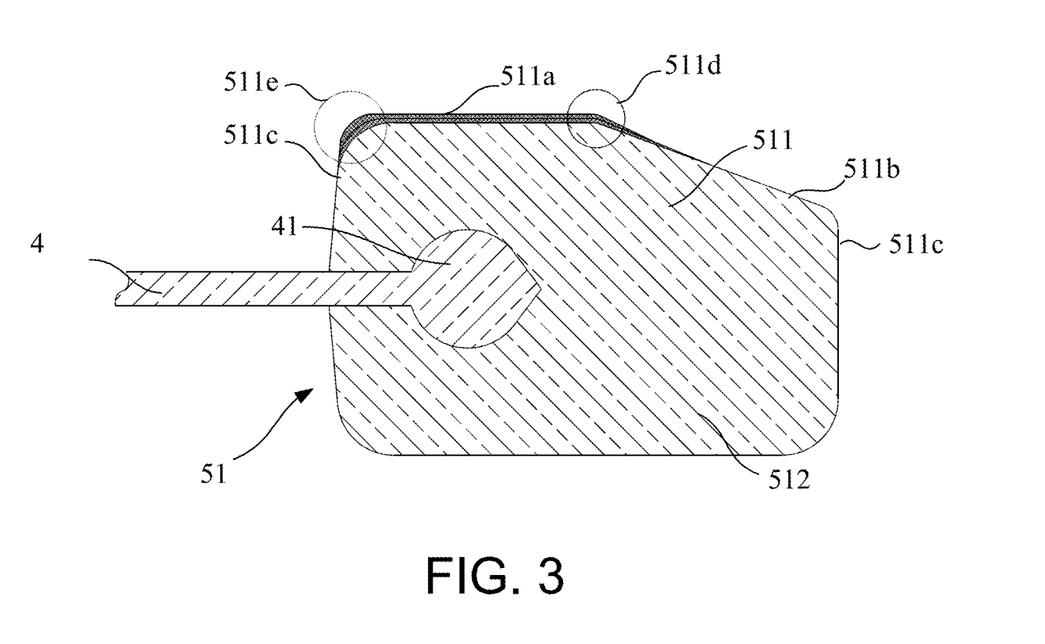
FIG. 3 is a cross-sectional view of the first type of slide fastener according to an embodiment of the disclosure.
Figure 4:
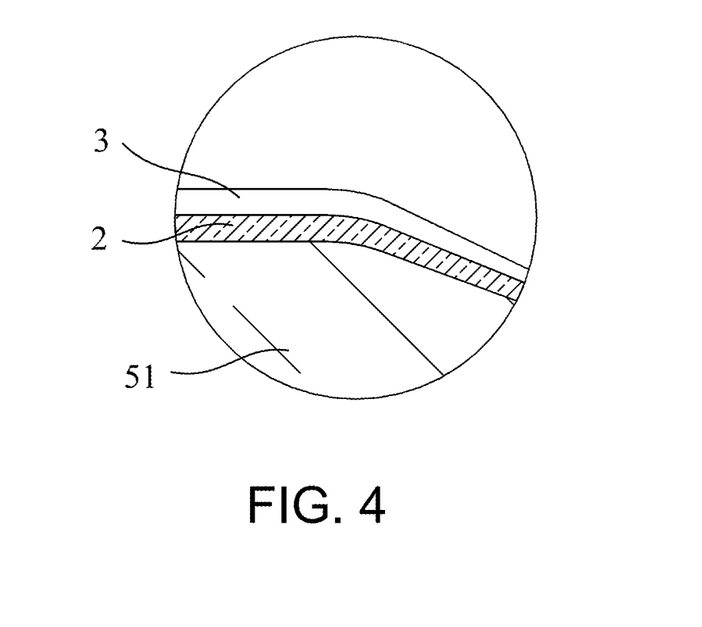
FIG. 4 is an enlarged view of a part $511d$ of a slide fastener element in FIG. 3.

In an embodiment as shown in FIG. 3 and FIG. 4, a core part 41 is disposed on the edge of the slide fastener tape 4 with the slide fastener element row 5 disposed thereon. The core part 41 swells upward and downward relative to the rest of the slide fastener tape 4, and extends along the edge of the slide fastener tape 4. A slide fastener element 51 is attached to the core part 41. The slide fastener element 51 includes an upper part 511 and a lower part 512, wherein the upper part 511 of the slide fastener element 51 is located above the slide fastener tape 4, and the lower part 512 of the slide fastener element 51 is located below the slide fastener tape 4. A surface of the upper part 511 of the slide fastener element 51 includes a top surface and a side surface 511c, wherein the top surface may include a planar part 511a, and an inclined part 511b which is downwardly inclined. During operation of the slide fastener, the planar part 511a of the top surface of the upper part 511 of the slide fastener element 51 is most likely to contact the body or limb. Therefore, the painting layer 2 and the rubber layer 3 may be disposed at least on the planar part 511a of the top surface of the upper part 511 of the slide fastener element 51. In addition, the painting layer 2 and the rubber layer 3 may also be disposed on, for example, a chamfer part 511e connecting the top surface with the side surface 511c of the upper part 511 of the slide fastener element 51, or a chamfer part 511d connecting the planar part 511a with the inclined part 511b of the top surface of the upper part 511 of the slide fastener element 51.

Figure 5:
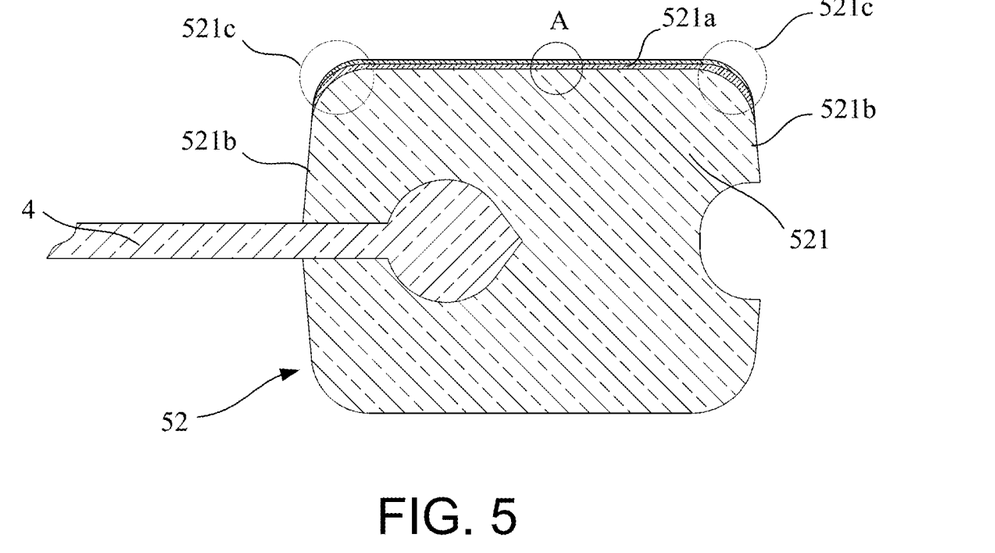
FIG. 5 is a cross-sectional view of a second type of slide fastener according to an embodiment of the disclosure.
Figure 6:
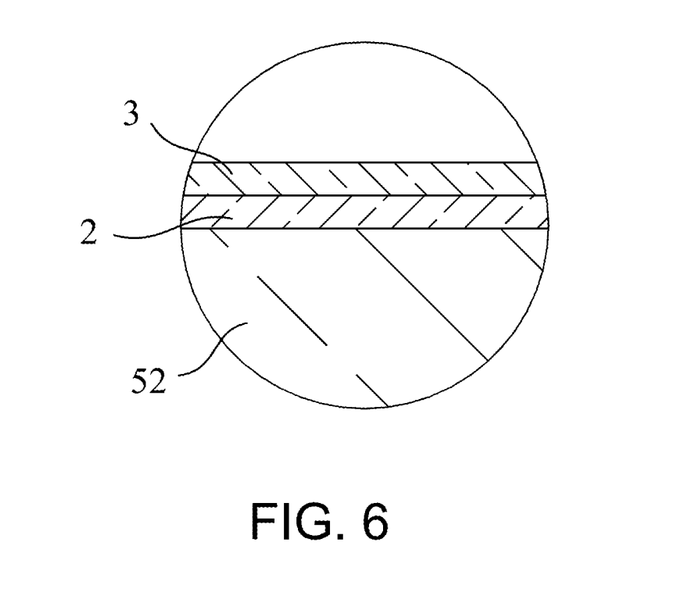
FIG. 6 is an enlarged view of part A of a slide fastener element in FIG. 5.
Figure 7:
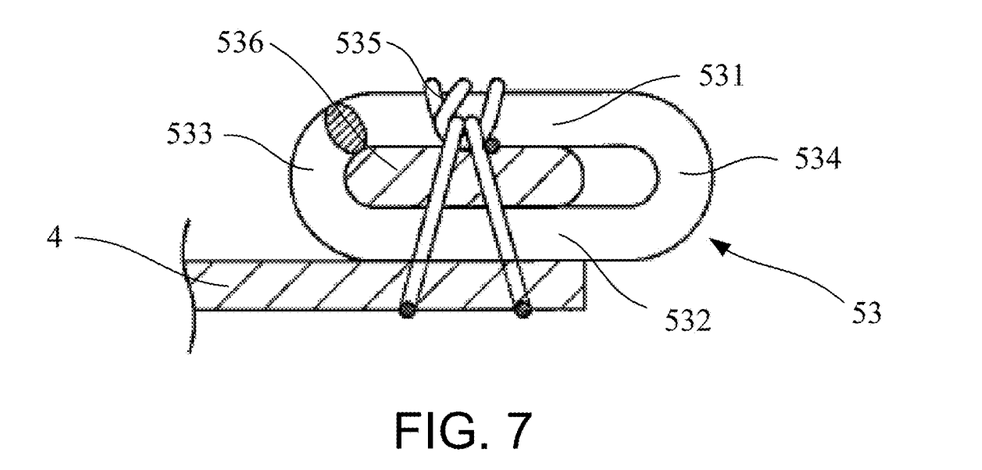
FIG. 7 is a cross-sectional view of a third type of slide fastener according to an embodiment of the disclosure.
Figure 8:
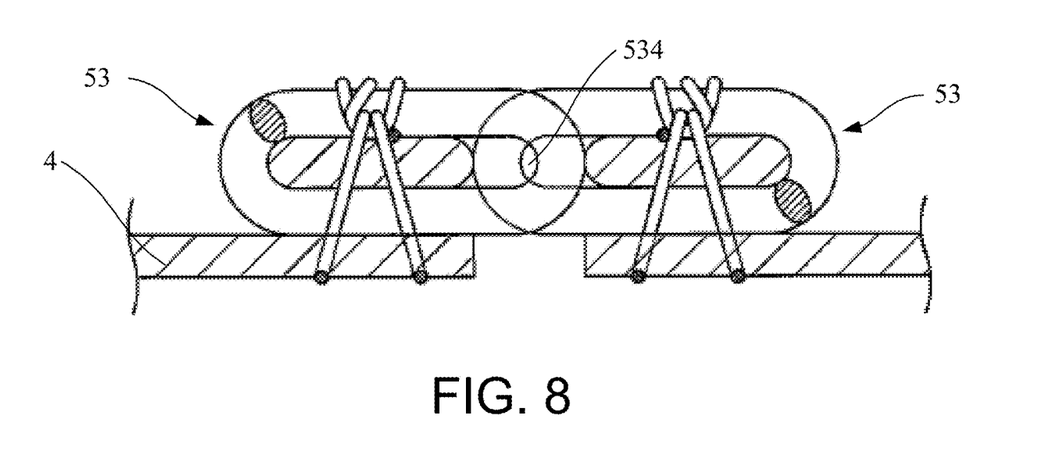
FIG. 8 is a schematic view of engagement of a slide fastener element of the third type of slide fastener according to an embodiment of the disclosure.
Figure 9:
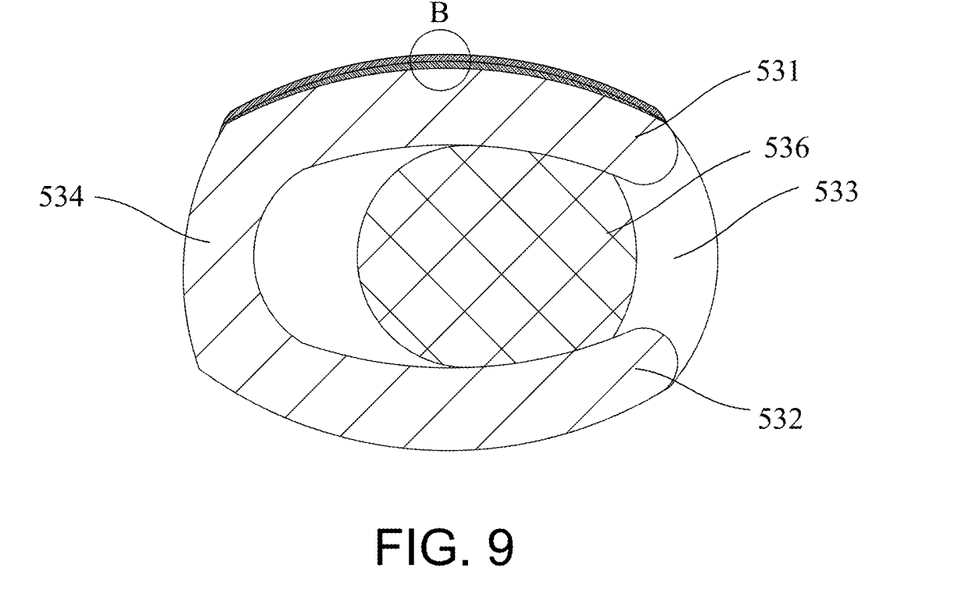
FIG. 9 is a schematic view of the slide fastener element of the third type of slide fastener according to an embodiment of the disclosure.
Figure 10:
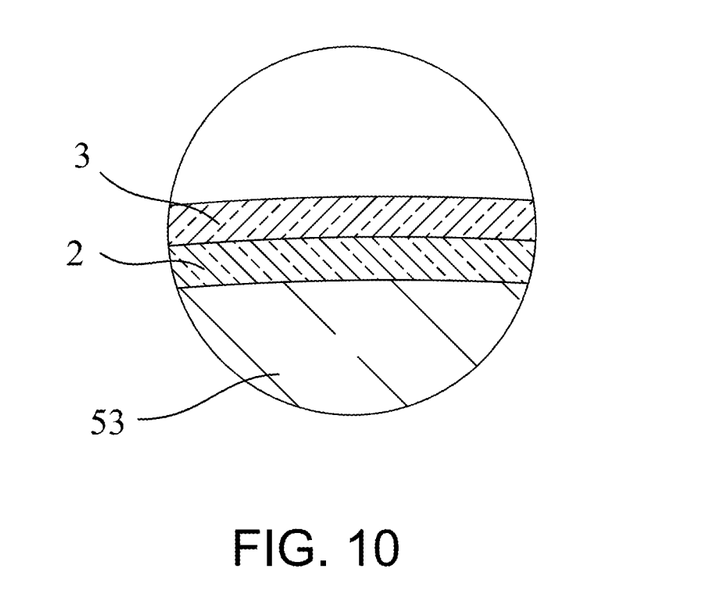
FIG. 10 is an enlarged view of part B of the slide fastener element in FIG. 9.
Figure 11:
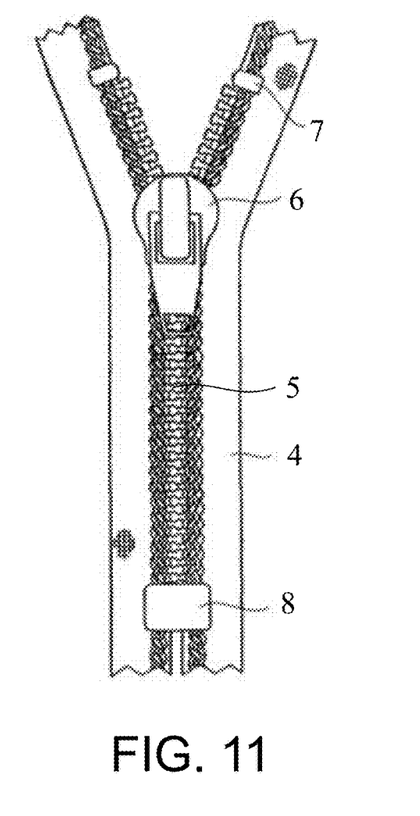
FIG. 11 is a top view of the third type of slide fastener according to an embodiment of the disclosure.

In another embodiment as shown in FIG. 5 and FIG. 6, a surface of an upper part 521 of a slide fastener element 52 includes a top surface 521a and a side surface 521b, wherein the top surface 521a is a plane. During operation of the slide fastener, in the slide fastener element having such a structure, the top surface of the upper part of the slide fastener element is most likely to contact the body or limb. Therefore, the painting layer 2 and the rubber layer 3 may be disposed at least on the top surface 521a of the upper part 521 of the slide fastener element 52. In addition, the painting layer 2 and the rubber layer 3 may also be disposed on a chamfer part 521c connecting the top surface 521a with the side surface 521b of the upper part 521 of the slide fastener element 52.

In another embodiment as shown in FIG. 7 to FIG. 11, a slide fastener element 53 is fixed to one side of the slide fastener tape 4. The slide fastener element 53 has a ring shape, including an upper leg part 531, a lower leg part 532, a connection part 533 and an engaging part 534, wherein the connection part 533 and the engaging part 534 are respectively connected to the upper leg part 531 and the lower leg part 532 at both ends, thus forming the ring shape. The lower leg part 532 is close to the slide fastener tape 4. The engaging part 534 is opposing the slide fastener element 53 of the slide fastener tape on the other side. The slide fastener element 53 is fixed to one side of the slide fastener tape 4 by a thread-like fixation object 535. The thread-like fixation object 535 may be a sewing thread, a knitting thread or the like. A center line 536 longitudinally passes through the slide fastener element 53 along the slide fastener. During use of the slide fastener element having such a structure, an exposed portion (especially a top surface of the upper leg part) of the slide fastener element is most likely to contact the body or limb. Therefore, the painting layer 2 and the rubber layer 3 may be disposed on a surface of the slide fastener element 53 other than a portion adhering to the slide fastener tape 4. For example, the painting layer 2 and the rubber layer 3 may be disposed at least on the top surface of the upper leg part 531 of the slide fastener element 53.

An upper stopper 7 and a lower stopper 8 may further be provided respectively on both ends of the slide fastener tape 4 in the length direction, for limiting the range of movement of the slide fastener slider 6.

Figure 12:
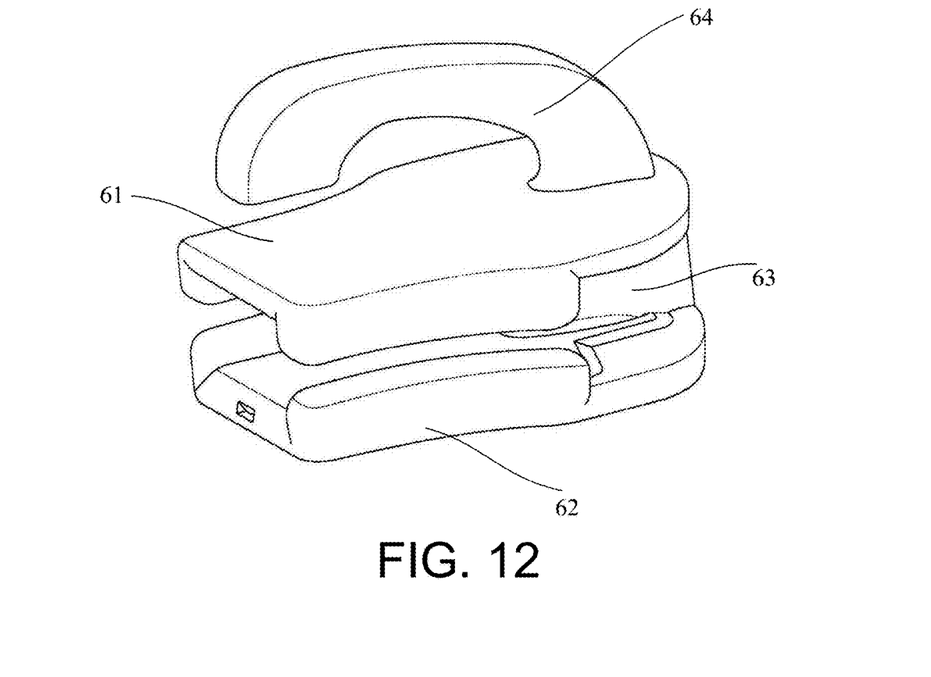
FIG. 12 is a schematic view of a slide fastener slider according to an embodiment of the disclosure.
Figure 13:
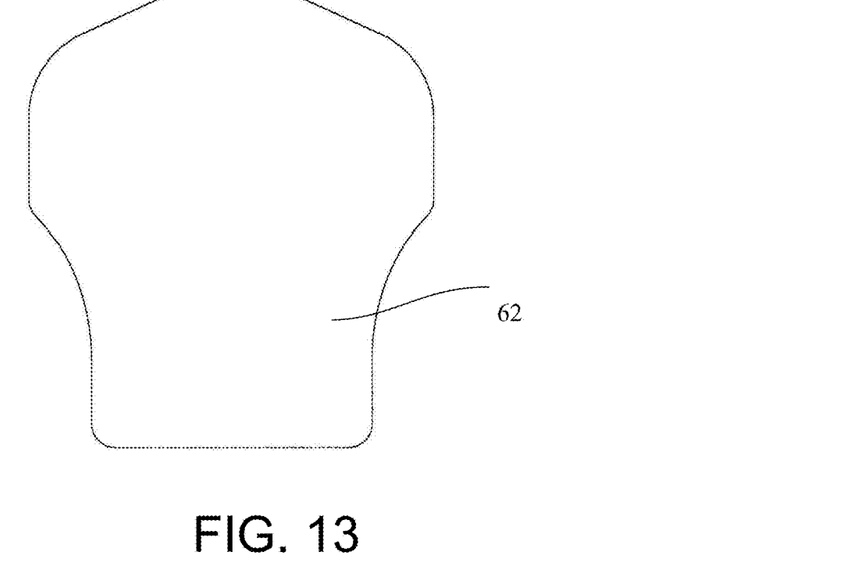
FIG. 13 is a schematic view of a lower blade of the slide fastener slider according to an embodiment of the disclosure.

FIG. 12 and FIG. 13 illustrate an embodiment of the slide fastener slider. The slide fastener slider 6 includes an upper blade 61, a lower blade 62, a connecting post 63 connecting the upper blade 61 with the lower blade 62, and an attachment post 64 for attaching a pull tab. In a resin slide fastener, a material of the slide fastener slider 6 may be resin or metal. During operation of the slide fastener, the lower blade 62 of the slide fastener slider 6 is most likely to contact the body or limb. Particularly, when the slide fastener slider 6 is made of metal, the lower blade 62 close to the skin is likely to provide a freezing feeling. Therefore, the painting layer and the rubber layer may be disposed at least on the lower blade 62 of the slide fastener slider 6, so as to prevent such freezing feeling. Furthermore, the painting layer and the rubber layer are formed at least on a bottom surface of the lower blade 62.

Figure 14:
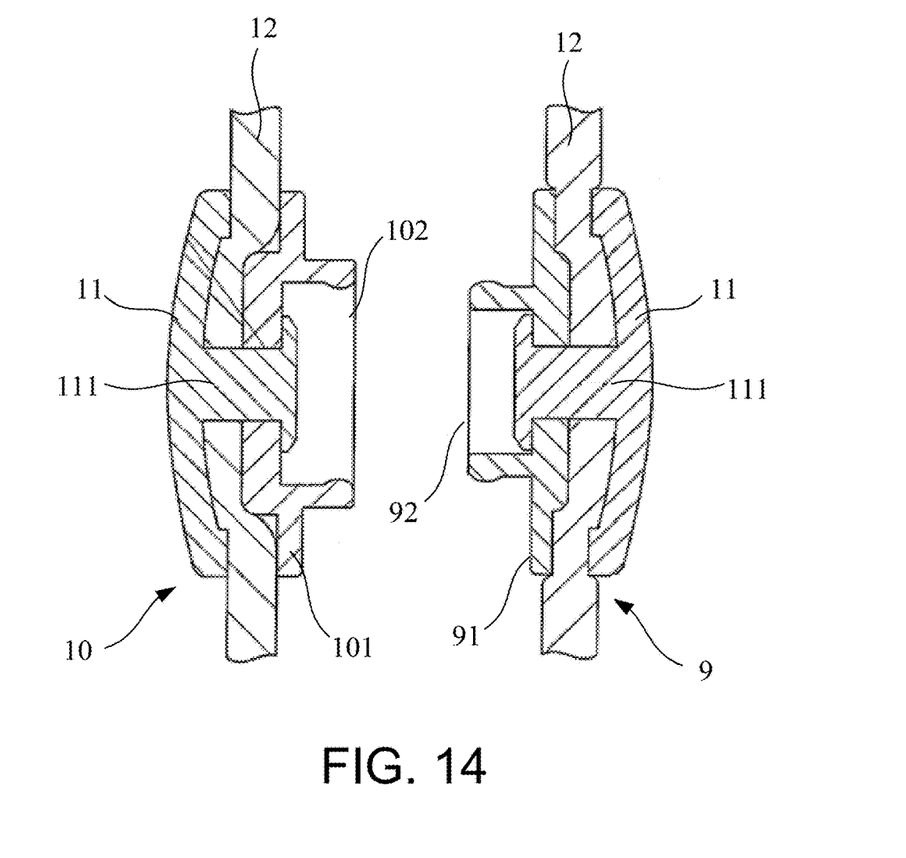
FIG. 14 is a cross-sectional view of a snap button according to an embodiment of the disclosure.

FIG. 14 illustrates a resin snap button of the disclosure, including a male fastener 9 and a female fastener 10. The male fastener 9 has an insert pin 91 and a cap 11. The female fastener 10 has a retainer box 101 and the cap 11. A projected foot part 111 for snapping is provided in the center of the cap 11. A hole allowing insertion of the foot part 111 for snapping is provided in the center of the insert pin 91 and the retainer box 101. The insert pin 91 and the retainer box 101 respectively have engagement parts 92 and 102 which match each other. When the engagement parts 92 and 102 are engaged with each other, a small amount of deformation may occur and then recover. The female fastener 10 and the male fastener 9 are snapped together by mutual resistance force between the engagement parts 92 and 102 in a free state. During use, a cloth 12 is sandwiched between the insert pin 91 and the cap 11 of the male fastener 9, and the cloth 12 is sandwiched between the retainer box 101 and the cap 11 of the female fastener 10. After the insert pin 91 and the retainer box 101 are arranged to be opposing each other, the caps 11 of the female fastener 10 and the male fastener 9 are pressed against each other to snap the female fastener 10 and the male fastener 9 together. When the snap button is in use, an outer side surface of the cap 11 is in contact with the body or limb in most cases. Therefore, according to some embodiments, the painting layer (not shown) and the rubber layer (not shown) are formed at least on the outer side surface of the cap 11. During use, an inner side surface of the cap 11, the insert pin 91 and the retainer box 101 generally do not contact the body or limb. Therefore, there is no need to dispose the painting layer and the rubber layer on them.

Figure 15:
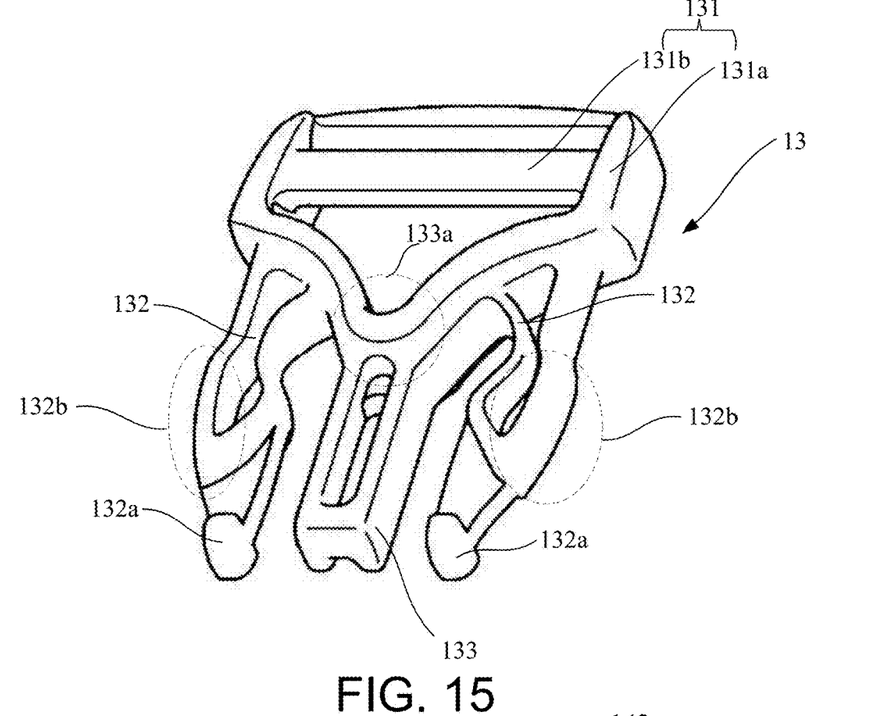
FIG. 15 is a schematic view of a male member of a buckle according to an embodiment of the disclosure.
Figure 16:
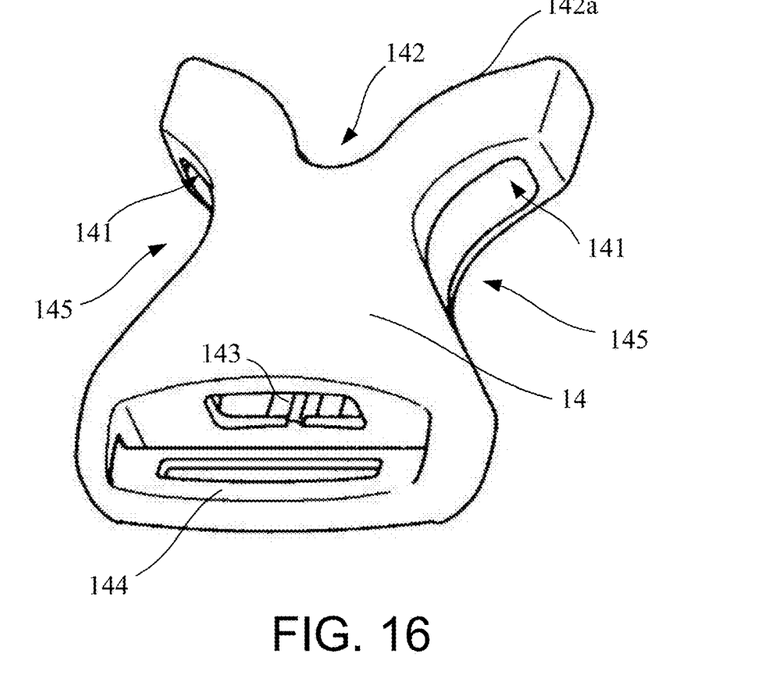
FIG. 16 is a schematic view of a female member of the buckle according to an embodiment of the disclosure.
Figure 17:
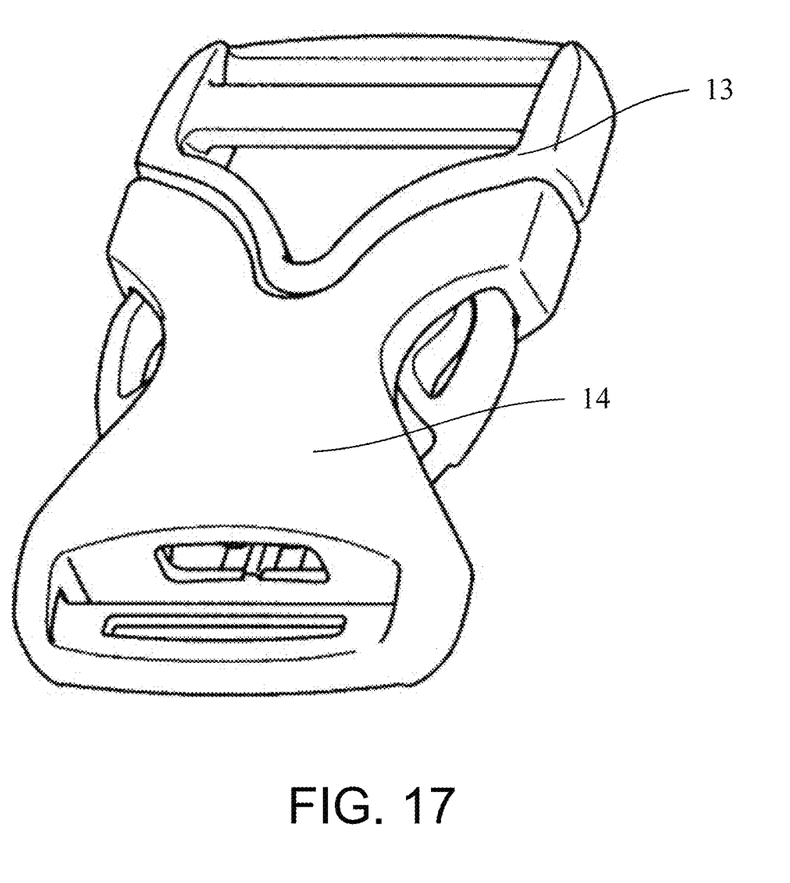
FIG. 17 is a schematic view of buckling between the female member and the male member of the buckle according to an embodiment of the disclosure.

FIG. 15 to FIG. 17 schematically illustrates an embodiment of a resin buckle including a male member 13 and a female member 14.

The male member 13 includes a base part, and a pair of leg parts 132 which are elastically deformable relative to each other, wherein one end of the leg parts 132 is connected to the base part. The base part includes a belt attachment part 131. The belt attachment part 131 includes a frame 131a, and a connecting rod 131b dividing the frame 131a into two portions in the front-back direction. During use, a belt-like accessory may be wound around the connecting rod 131b and be wound off from the frame 131a, by which an actually used length of the belt-like accessory can be adjusted. The frame 131a of the belt attachment part 131 may have a polygonal shape, for example, a square, a pentagonal shape or the like. During use, an outer surface of the frame 131a of the base part is particular likely to contact the body or limb. Therefore, the painting layer and the rubber layer may be disposed on the outer surface of the frame 131a. For example, the painting layer (not shown) and the rubber layer (not shown) may be disposed on an outer side surface and a top surface of the frame 131a of the base part. It is not necessary to dispose the painting layer and the rubber layer on an inner surface of the frame 131a. The painting layer and the rubber layer may be selectively disposed on the connecting rod 131b.

The base part further includes a projected part 133. A root part 133a of the projected part 133 is provided on one side of the frame 131a closer to the leg part 132. A main body of the projected part 133 is located between the pair of leg parts 132. When no external force is acting, the main body of the projected part 133 does not contact the leg part 132. The projected part 133 is designed to allow room for movement of the leg part 132 and also to prevent excessive deformation of the leg part 132. The projected part 133 generally does not contact the body or limb, and it is not necessary to dispose the painting layer and the rubber layer on the projected part 133.

The leg part 132 includes an elastic member extending along a direction in which the male member 13 is inserted into the female member 14. The elastic member may include one to a plurality of elastic pieces. Under action of external force, the elastic piece may be elastically deformed by approaching the projected part 133. The leg part 132 includes a bent part 132b which is outwardly convex. When the leg part 132 is inserted into the female member 14, a sidewall of a guide groove 141 in the female member 14 may provide an inward pressure to the bent part 132b to enable the leg part 132 to be elastically deformed inward. When the male member 13 and the female member 14 are to be detached and separated from each other, an operator may provide an inward pressing external force to the exposed bent part 132b, so as to cause both leg parts 132 to approach inward. With the assistance of a push force or pull force which causes the male member 13 to retreat, the male member 13 and the female member 14 can be detached and separated from each other. Furthermore, an engagement part 132a may be provided on a free end of the leg part 132 to match and be engaged with an engagement part 142a of the female member 14. The bent part 132b of the leg part 132 of the male member 13 may also be exposed and be used as an operation part for detaching and separating the female member 14 and the male member 13 from each other. Therefore, according to some embodiments, the painting layer and the rubber layer may be disposed on an outer side surface of the bent part 132b.

The female member 14 of the resin buckle includes a flat barrel-shaped main body, wherein one end of the main body of the female member 14 has an insertion opening 142 allowing insertion of the pair of leg parts 132 of the male member 13. An edge shape of the insertion opening 142 should match an edge shape of the frame 131a of the base part of the male member 13 facing the female member 14, so as to enable smooth transition between exteriors of the female member 14 and the male member 13 when the female member 14 and the male member 13 are buckled, and to obtain better fixation. A belt attachment hole 143 and a connecting rod 144 are provided on the other end of the main body of the female member 14. The belt attachment hole 143 and the connecting rod 144 may be used for attaching and fixing the belt-like accessory. The guide groove 141 is provided in the main body of the female member 14, allowing the leg part 132 to slide therethrough to be elastically deformed inward. The guide groove 141 is close to the insertion opening 142. An opening part 145 is provided in a position on left and right sidewalls of the main body of the female member 14 close to a distal end of the guide groove 141. The opening part 145 is for recovery of the leg part 132. The combination of the guide groove 141 and the opening part 145 makes it possible to complete a process from inwardly elastic deformation until recovery of the leg part 132. When the bent part 132b of the leg part 132 has advanced to the opening part 145, since the inward pressure disappears, the leg part 132 is recovered.

Furthermore, an engagement part 142a may be provided on the main body of the female member 14 to match the engagement part 132a of the leg part 132 of the male member 13. Generally, the positions of the engagement parts match where the engagement parts are located after the female member 14 and the male member 13 have been attached and fixed, so that the matching between the female member 14 and the male member 13 can become more stable.

Since an outer surface of the main body of the female member 14 is likely to contact the body or limb during operation, the painting layer and the rubber layer may be disposed on the outer surface of the main body of the female member 14. Since an inner surface of the main body of the female member 14 is less likely to contact the body or limb during operation, there is no need to dispose the painting layer and the rubber layer on the inner surface of the main body of the female member 14.

The resin material is hard plastic. Specifically, the resin material may be polybutylene terephthalate (PBT) or nylon. In a specific example of the disclosure, the rubber layer is coated on a PBT surface. The method of the disclosure is also applicable to nylon.

The paint may be an oil-based paint or a water-based paint. The paint may be selected from various common paints including but not limited to, an epoxy resin paint, an acrylic urethane paint, an acrylic melamine resin paint, a polyurethane paint, an alkyd resin paint, an acrylic paint, a chlorinated olefin paint, a polyurea elastomer, an organosilicon resin paint, a polysiloxane paint, a fluorine-containing polymer paint, an unsaturated polyester paint, a vinylester paint, a polyaniline paint and so on.

According to some embodiments, in the paint for forming the painting layer, the pigment has a weight percentage of 10% to 30%. For example, the pigment may have a weight percentage of 10% to 15%, 15% to 20%, 20% to 25%, or 25 to 30%, and more specifically, 10%, 11%, 12%, 13%, 14%, 15%, 16%, 17%, 18%, 19%, 20%, 21%, 22%, 23%, 24%, 25%, 26%, 27%, 28%, 29%, or 30%. Since it is difficult for the pigment to dissolve in the paint, when the content of the pigment exceeds 30%, the painting is less likely to be performed; when the content of the pigment is less than 10%, the painted surface is reduced in surface roughness.

The pigment is a color pigment, and may be an inorganic pigment or an organic pigment. Depending on its function, the pigment in the paint may be classified as an antirust pigment, a color pigment, a body pigment (extender), or other functional pigment. The color pigment is generally used for coloring and covering an object surface. The color pigment has good coloring power and covering power. The color pigment used in the method of the disclosure may be various existing color pigments. Examples thereof include chrome yellow, antimony yellow, iron oxide yellow, cadmium yellow (CdS), hansa yellow, benzidine yellow, chromium oxide green, chrome green, iron blue, ultramarine blue, iron red (iron oxide red), cadmium red, molybdate red, iron black, aluminum powder (commonly known as silver powder), copper powder (commonly known as gold powder), zinc oxide, lithopone, titanium white, antimony white, white lead, carbon black, graphite, aniline black and so on. According to some embodiments, after the color pigment and the selected paint are mixed together at a predetermined ratio, the painting layer obtained by painting has surface roughness of 2 µm to 7 µm. For example, the surface roughness may be 2 pun to 3 µm, 3 µm to 4 µm, 4 µm to 5 µm, 5 µm to 6 µm, or 6 µm to 7 µm. Based on the above standard, those skilled in the art may confirm the matching between the pigment and the paint through simple experiments. In a specific example of the disclosure, carbon black is used.

In conventional paints, the proportion of the color pigment is typically lower, generally 2% or lower and basically not higher than 5%. Hence, conventional color paints cannot meet the requirement of roughness and thus cannot be satisfactorily applied to the disclosure.

According to some embodiments, the painting layer may have a thickness of 30 µm to 50 µm, for example, 30 µm to 35 µm, 35 µm to 40 µm, 40 µm to 45 µm, or 45 µm to 50 µm; according to some embodiments, the thickness of the painting layer is 30 µm.

In the disclosure, the paint used in the painting layer is used as an undercoat paint.

According to some embodiments, the rubber layer may have a thickness of 5 µm to 20 µm, for example, 5 µm to 10 µm, 10 µm to 15 µm, or 15 µm to 20 µm; according to some embodiments, the thickness of the rubber layer is 10 µm.

With respect to the rubber layer formed on the surface of the resin material by using the method of the disclosure, since the pigment has been added to the paint for forming the painting layer, the painting layer is increased in surface roughness, and its adhesion with the rubber coating is improved. Thus, the rubber layer is more firmly fixed and is less likely to fall off. Whether the paint is an oil-based paint or a water-based paint, a solvent component thereof is volatilized after drying, thereby forming a film in the end. Therefore, both oil-based paints and water-based paints are applicable to the disclosure. The proportion of the pigment is controlled in order to obtain suitable roughness.

The painting layer may fully or partially cover the surface of the resin material body. The rubber layer may fully or partially cover the painting layer. According to some embodiments, the painting layer is painted everywhere covered by the rubber layer and between the rubber layer and the resin material body.

The painting layer and the rubber layer may be formed on all or part of the outer surface of the slide fastener element and/or the slide fastener slider. According to some embodiments, the painting layer and the rubber layer are formed on all or part of the outer surface of the slide fastener element and/or the slide fastener slider that may contact a body or limb.

The resin snap button includes a male fastener and a female fastener, wherein the male fastener and the female fastener both include a cap. In the resin snap button, the painting layer and the rubber layer are formed at least on all or part of a surface of the cap.

The resin buckle includes a male member and a female member. The male member includes an elastically deformable leg part, and the female member includes a main body allowing the leg part of the male member to be inserted therein. The painting layer and the rubber layer are formed at least on all or part of an outer surface of the main body of the female member.

The rubber layer formed on the surface of the resin material using the method of the disclosure is more firmly fixed and is less likely to fall off.

The above examples are for the purpose of illustrating the disclosed embodiments of the disclosure and are not to be construed as limiting the disclosure. In addition, the various modifications listed herein as well as variations in the methods and compositions of the disclosure will be obvious to those skilled in the art without departing from the scope and spirit of the disclosure. Although the disclosure has been specifically described with reference to several specific examples of the disclosure, it should be noted that the disclosure is not limited to these specific examples. In fact, various modifications obvious to those skilled in the art as described above to obtain the disclosure should be included in the scope of the disclosure.

What is claimed is:

1. A resin material structure of a slide fastener element, comprising:
the slide fastener element having a resin material body, wherein a painting layer and a rubber layer are sequentially formed from inside to outside on a surface of the resin material body of the slide fastener element, a bottom surface of the rubber layer is entirely covered by the painting layer, and a paint for forming the painting layer contains a pigment.

2. The resin material structure of the slide fastener element according to claim 1, wherein the paint is an oil-based paint or a water-based paint, and the pigment is a color pigment.

3. The resin material structure of the slide fastener element according to claim 1, wherein the paint for forming the painting layer is selected from an epoxy resin paint, an acrylic urethane paint, an acrylic melamine resin paint, a polyurethane paint, an alkyd resin paint, an acrylic paint, a chlorinated olefin paint, a polyurea elastomer, a silicone resin paint, a polysiloxane paint, a fluorine-containing polymer paint, an unsaturated polyester paint, a vinylester paint, or a polyaniline paint.

4. The resin material structure of the slide fastener element according to claim 1, wherein in the paint for forming the painting layer, the pigment has a weight percentage of 10% to 30%.

5. The resin material structure of the slide fastener element according to claim 1, wherein the painting layer has surface roughness of 2 µm to 7 µm.

6. The resin material structure of the slide fastener element according to claim 1, wherein the pigment is one or more of chrome yellow, antimony yellow, iron oxide yellow, cadmium yellow, hansa yellow, benzidine yellow, chromium oxide green, chrome green, iron blue, ultramarine blue, iron red, cadmium red, molybdate red, iron black, aluminum powder, copper powder, zinc oxide, lithopone, titanium white, antimony white, white lead, graphite, aniline black, and carbon black.

7. The resin material structure of the slide fastener element according to claim 1, wherein the painting layer has a thickness of 30 µm to 50 µm.

8. The resin material structure of the slide fastener element according to claim 1, wherein the painting layer fully or partially covers the surface of the resin material body, and the rubber layer fully covers the painting layer.

9. The resin material structure of the slide fastener element according to claim 1, wherein the painting layer and the rubber layer are formed using a method that comprises:

first, performing painting on the surface of the resin material body to form the painting layer, using a paint to which a pigment has been added; and then, performing rubber coating to form the rubber layer on the painting layer.

10. The resin material structure of the slide fastener element according to claim 1, wherein the painting layer fully or partially covers the surface of the resin material body, and the rubber layer partially covers the painting layer.

* * * * *